L. K. BENEDICT.
TRACTOR WHEEL.
APPLICATION FILED NOV. 30, 1917.
1,309,010.
Patented July 8, 1919.
2 SHEETS—SHEET 2.
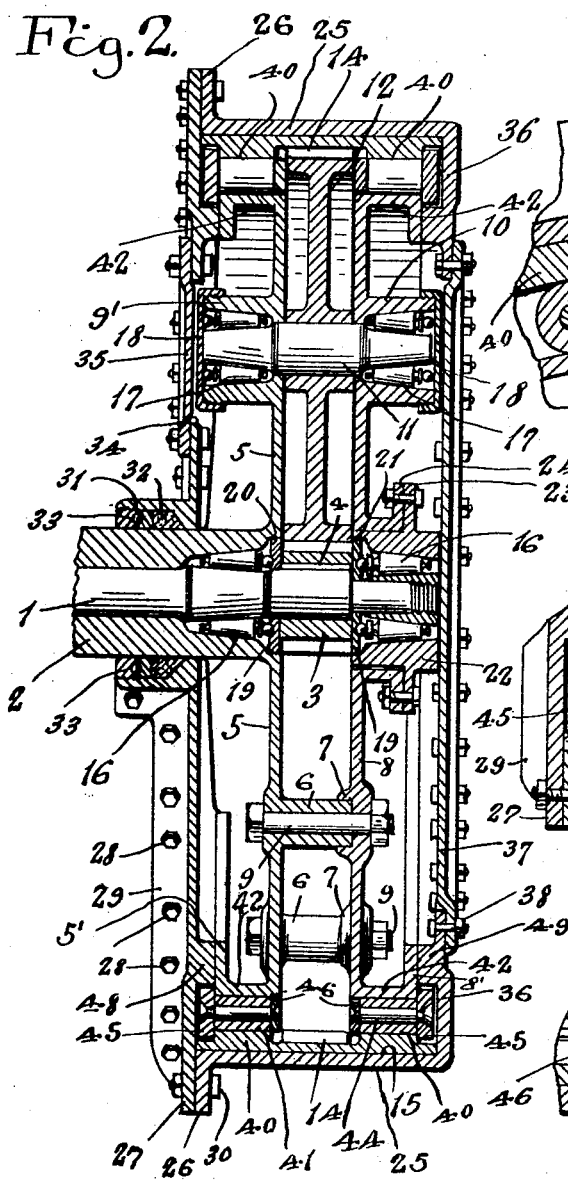
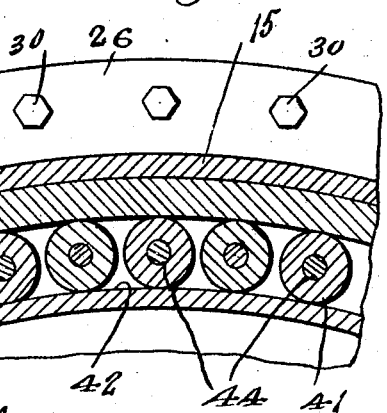
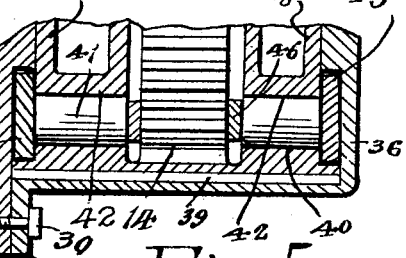
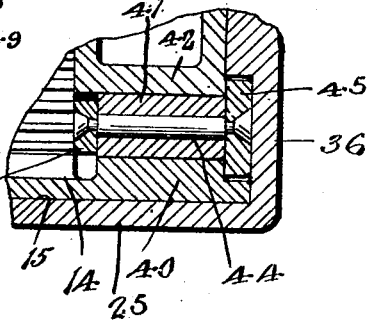
Inventor
L. K. Benedict.

UNITED STATES PATENT OFFICE.

LOUIS K. BENEDICT, OF HASTINGS, FLORIDA.

TRACTOR-WHEEL.

1,309,010.  Specification of Letters Patent.  Patented July 8, 1919.

Application filed November 30, 1917. Serial No. 204,685.

*To all whom it may concern:*

Be it known that I, LOUIS K. BENEDICT, a citizen of the United States, residing at Hastings, in the county of St. Johns and State of Florida, have invented certain new and useful Improvements in Tractor-Wheels; and I do hereby declare the following to be a full, clear, and exact description of the invention, such as will enable others skilled in the art to which it appertains to make and use the same.

This invention relates to tractor wheels and the primary object of the invention is to improve the construction of the drive or bull wheels of tractors to increase the longevity of the wheels and eliminate lost motion in transmission of power to the wheel due to the wearing of parts of the wheel under usage.

In the majority of tractors now in use, the bull or drive wheels are driven by a small pinion meshing with a large gear carried by the wheel. These gears are more or less exposed to sand or grit which soon destroys the true outline and causes the whole load to be carried by one tooth, the result being that the erosion increases in geometric progression until the tractor is rendered incapable of performing its function.

It is an object of this invention to overcome the inconveniences contingent with the driving of tractors in the above manner, by providing an annular internal gear carried by a rotatable rim structure which gear meshes with a plurality of gears that are propelled from a single pinion positioned at the exit of the drive or bull wheels of the tractor thereby materially increasing the tooth area of the wheel; and further to provide a wheel in which all of the gears are inclosed within the shell including the rim structure to prevent dirt, sand or the like from accumulating upon the gears and to retain oil within the wheels to lubricate the working parts thereof.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Fig. 2 is a diametric section through the wheel.

Fig. 3 is an enlarged fragmentary section through a part of the wheel structure.

Fig. 4 is a section on the line 4—4 of Fig. 1, and

Fig. 5 is an enlarged detail of a part of the wheel construction.

Figure 1:
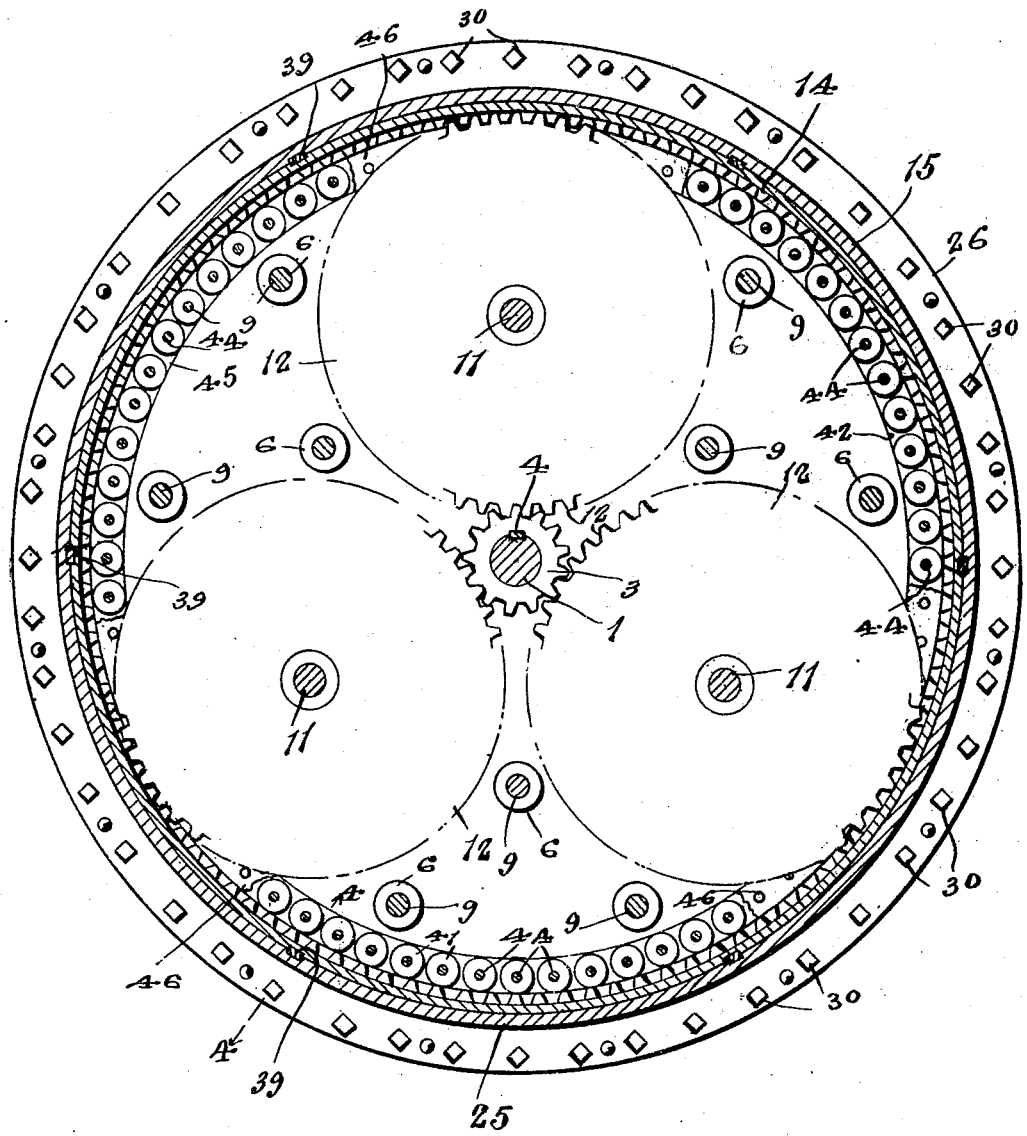
Figure 1 is a section through the improved tractor wheel.

Referring more particularly to the drawings, 1 designates the axle of a tractor which is inclosed by a casing 2. The axle 1 may be operatively connected in any suitable manner to the prime mover of a tractor and it has a pinion 3 keyed thereon by an ordinary key 4, for rotating the pinion by the rotation of the axle spindle.

The casing 2 has a web like extension 5 formed integrally thereon which extension is circular in face view and projects within the wheel structure as clearly shown in Fig. 2 of the drawings. The web 5 has a plurality of barrels 6 formed integrally therewith and projecting outwardly therefrom, through the outer ends of which are seated in sockets 7 formed upon the inner face of a plate or web 8 which is circular shaped in face view and lies parallel with the plate or web 5. Bolts 9 extend through the barrel 6 and connect the plates 5 and 8. The plates 5 and 8 have bearings 9' and 10 respectively formed thereon which rotatably support shafts 11 upon which are mounted gears 12. There are three of the gears 12 and they mesh with the pinion 3 and with an internal gear 14 the teeth of which are formed upon the inner surface of a metal ring 15.

The casing 2 is provided with a bearing structure in which are mounted anti-friction bearings as indicated at 16 which bearings are preferably the ones that are commercially known as "Timken bearings" and the bearings 9' and 10 also have Timken bearings or analogous anti-friction bearings 17 mounted therein. The bearings 17 are adjusted by the screwing of caps 18 upon or outwardly from the ends of the bearings 9' and 10, as shown in Fig. 2 of the drawings, while the bearings 16 are tensioned or regulated by the adjustment of nuts 19 which are screw threadably mounted in recesses 20 and 21 that are formed in the housing 2 and a block or collar structure 22 which is attached to the plate 8 at the center of the same by means of bolts 23 that extend through the casing flanges 24 formed upon the plate 8 and the collar 22.

The rim 25 of the wheel has an outwardly extending flange 26 formed thereon to which is connected a plate 27. The plate 27 is preferably formed of two pieces connected by bolts 28 that extend through flanges 29 formed upon the two sections of the plate. The plate 27 is attached to the flange 26 by bolts 30 and it forms a closure for the inner side of the wheel. The plate 27 has a bearing collar 31 formed at the center of the same in which is mounted a stuffing box structure 32 to prevent the escape of oil from the interior of the wheel structure about the casing 2. Suitable bearing balls 33 are carried by the collar structure 31 and engage the outer ends of the stuffing box structure 32.

The plate 27 is provided with openings 34 formed therein in alinement with the bearing 9 carried by the plate or web 5 and these openings are closed by suitable plates 35.

An inwardly extending flange 36 is formed upon the rim 25 and extends inwardly toward the axis of the wheel at the outer side of the wheel, having a dished plate 37 attached thereto by means of bolts 38. The plate 37 forms the closure for the outer side of the wheel structure and it, in connection with the plate 27 provides a dust proof housing for the gears and pinions which are mounted within the wheel structure.

The ring 15 which carries the internal gear 14 is keyed by means of keys 39 to the wheel rim 25 and it has annular tracks 40 formed upon its inner circumference and positioned upon each side of the gear teeth which form the internal gear 14, as clearly shown in Fig. 2 of the drawing. Suitable rollers 41 engage the tracks 40 and also engage tracks 42 which are formed upon the peripheries of the plates 5 and 8, by bending the peripheries outwardly away from each other to provide the circular track portion.

The rollers 41 are rotatably mounted upon pins 44 which pins have their ends riveted to rings 45 and 46 which extend about the inner circumference of the ring 15 upon each end or side of the track structure 40. The pins 44 are connected to the ring by upsetting the heads of the pins as clearly shown in Fig. 5 of the drawings.

It often happens that a tractor works for hours with one wheel lower than the other, which working conditions make it necessary to have strong end thrust bearings, and for this purpose annular inwardly extending bosses or enlargements 48 and 49 are formed upon the inner surfaces of the plate 27 and the flange 36 respectively, forming end thrust bearings which work against the projecting flanges 5' and 8' formed upon stationary plates 5 and 8.

The rim structure including the wheel rim 25, the metal ring 15, plates 27 and 37 rotates about the stationary portion of the wheel structure which comprises the plates 5 and 8, upon the rollers 41 as bearings, and therefore the bearing surface of the wheel is greatly increased over the ordinary surface of a wheel which rotates upon the spindle that extends into the hub of the wheel and consequently the wear occasioned by the rotation of the wheel is distributed over a much greater area and materially decreased, or practically eliminated by the provision of the rollers 41 and the tracks 40 and 42.

From the foregoing description taken in connection with the accompanying drawings the advantages of construction and the method of operating the improved tractor wheel will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

1. In a tractor wheel, a rigid internal structure, a plurality of gears rotatably carried by said rigid internal structure, a pinion meshing with said gears for rotating the gears, a rim structure rotatably mounted about said rigid structure, a ring attached to the inner surface of said rim, said ring having its inner surface provided with gear teeth and tracks spaced upon each side of said gear teeth, said first named gears meshing with said last named gear teeth for rotating said rim structure, and bearing rollers carried by said rigid internal structure and engaging said tracks.

2. In a tractor wheel, a rigid internal structure, a plurality of gears rotatably carried by said rigid internal structure, a pinion meshing with said gears for rotating the gears, a rim structure rotatably mounted about said rigid structure, a ring attached to the inner surface of said rim, said ring having its inner surface provided with gear teeth and tracks spaced upon each side of said gear teeth, said first named gears meshing with said last named gear teeth, bearing rollers carried by said internal rigid structure and engaging said tracks, and plates attached to said rim structure for inclosing the internal rigid structure therein.

3. In a tractor wheel, a rigid internal structure, a plurality of gears rotatably carried by said rigid internal structure, a pinion meshing with said gears for rotating the gears, a rim structure rotatably mounted about said rigid structure, a ring attached to the inner surface of said rim, said ring having its inner surface provided with gear teeth and tracks spaced upon each side of the gear teeth, said first named gears meshing with said last named gear teeth, bearing rollers carried by said internal rigid structure and engaging said tracks, plates attached to said rim structure for inclosing the internal rigid structure, and an annular inwardly extending portion formed upon the inner surface of one of said plates and working against said stationary internal structure for forming an end thrust bearing.

4. In a tractor wheel, a rigid internal structure, a rim structure mounted for rotation about said rigid internal structure, means carried by rigid internal structure, for rotating said rim, plates attached to said rim structure and inclosing the internal rigid structure, and annular inwardly extending bosses formed upon one of said plates adjacent its periphery and forming end thrust bearings for working against said internal rigid structure.

In testimony whereof I affix my signature in presence of two witnesses.

LOUIS K. BENEDICT.

Witnesses:
E. D. SMITHDEAL,
CYRUS H. SMITHDEAL.

Copies of this patent may be obtained for five cents each, by addressing the "Commissioner of Patents, Washington, D. C."